(12) United States Patent
Arnold

(10) Patent No.: US 6,679,057 B2
(45) Date of Patent: Jan. 20, 2004

(54) VARIABLE GEOMETRY TURBOCHARGER

(75) Inventor: Steven Don Arnold, Rancho Palos Verdes, CA (US)

(73) Assignee: Honeywell-International Inc., Morristown, NJ (US)

( * ) Notice: Subject to any disclaimer, the term of this patent is extended or adjusted under 35 U.S.C. 154(b) by 0 days.

(21) Appl. No.: 10/091,780

(22) Filed: Mar. 5, 2002

(65) Prior Publication Data

US 2003/0167767 A1 Sep. 11, 2003

(51) Int. Cl.⁷ .......................... F02D 23/00; F01D 17/12
(52) U.S. Cl. .............................. 60/602; 415/158; 92/136
(58) Field of Search ........................ 60/602; 415/160, 415/158, 163, 164; 92/136

(56) References Cited

U.S. PATENT DOCUMENTS

| | | | | |
|---|---|---|---|---|
| 2,996,996 A | * | 8/1961 | Jassniker | 415/158 |
| 3,288,035 A | * | 11/1966 | Ryzner | 92/136 |
| 3,377,799 A | * | 4/1968 | Geyer | 415/160 |
| 4,274,329 A | * | 6/1981 | Weyer | 92/136 |
| 4,292,807 A | * | 10/1981 | Rannenberg | 415/158 |
| 5,044,880 A | * | 9/1991 | McKean | 415/158 |
| 5,868,552 A | * | 2/1999 | McKean et al. | 415/158 |
| 6,203,272 B1 | * | 3/2001 | Walsham | 415/158 |
| 6,212,889 B1 | * | 4/2001 | Martin | 60/602 |
| 6,269,642 B1 | | 8/2001 | Arnold et al. | 60/602 |
| 6,401,563 B1 | * | 6/2002 | Franklin | 60/602 |

\* cited by examiner

*Primary Examiner*—Thomas Denion
*Assistant Examiner*—Thai-Ba Trieu
(74) *Attorney, Agent, or Firm*—Ephraim Starr; Brian Pangrite

(57) ABSTRACT

A turbocharger comprises a center housing, and a shaft positioned therein having a first end and a second end. A turbine housing is attached to one side of the center housing and has a turbine wheel disposed therein that is coupled to the first end of the shaft. A first variable geometry member is disposed within the turbine housing between an exhaust gas inlet and the turbine wheel. A compressor housing is attached to another side of the center housing opposite the turbine housing, and includes a compressor impeller disposed therein. The compressor impeller is coupled to the second end of the shaft. A second variable geometry member is disposed within the compressor housing, and is interposed between an air outlet and the compressor impeller. An actuator assembly is disposed within the turbocharger and is connected to both of the variable geometry members to provide simultaneous actuation of the same.

12 Claims, 2 Drawing Sheets

VARIABLE GEOMETRY TURBOCHARGER

FIELD OF THE INVENTION

The present invention relates generally to the field of turbochargers and, more particularly, to a variable geometry turbocharger comprising a variable geometry turbine members and variable geometry compressor members, and a system for providing simultaneous control of the same.

BACKGROUND OF THE INVENTION

Turbochargers for gasoline and diesel internal combustion engines are known devices used in the art for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing.

The exhaust gas-driven turbine is mounted onto one end of a shaft that is common to a radial air compressor impeller mounted onto an opposite end of the shaft. Thus, rotary action of the turbine also causes the air compressor impeller to spin within a compressor housing of the turbocharger that is separate from the turbine housing. The spinning action of the air compressor impeller causes intake air to enter the compressor housing and be pressurized or boosted a desired amount before it is mixed with fuel and combusted within the engine combustion chamber.

The amount by which the intake air is boosted or pressurized can be controlled by regulating the amount of exhaust gas that is passed through the turbine housing by a wastegate. Alternatively, the amount by which the intake air is boosted or pressurized can be controlled by changing the geometry of a movable member in the turbine housing that operates to regulate the passage of exhaust gas to the turbine. This alternative method of boost air regulating can be provided by opening or closing a movable exhaust gas channel or passage to the turbine running through the turbine housing, and/or by adjusting the position of one or more movable vanes disposed within the turbine housing to vary the gas flow velocity of exhaust gas to the turbine.

The use of adjustable vanes within a turbine housing can be used as one way of reducing turbo lag, i.e., the lag time between the time that the vehicle is accelerated from idle and sufficient pressure is developed by the turbocharger compressor to effect an appreciable increase in engine power, by reducing the flow area within the turbine housing to provide the necessary power to quickly accelerate the turbine wheel.

As the volumetric flow rate of exhaust gas increases with increasing engine RPM, the vanes are adjusted to increase the flow area within the turbine housing to enable the exhaust gas to generate the appropriate power to compress the necessary quantity of inlet air.

Turbochargers constructed having such an adjustable member within the turbine housing are referred to in industry as variable geometry turbochargers (VGTs). The movable member within such VGTs, in the form of vanes, nozzles or the like, is positioned in the turbine housing between an exhaust gas inlet and the turbine. The movable member is activatable from outside of the turbine housing by a suitable actuating mechanism to increase or decrease the exhaust gas flow within the turbine housing to regulate the air intake boost pressure as called for by the current engine operating conditions, as explained above.

VGTs known in the art can be actuated by using a pneumatic activating means, i.e., by using compressed air or the like or by hydraulic activating means, i.e., by using a pressurized fluid such as oil or the like. An example hydraulically activated actuator comprises a combined piston and rack and pinion assembly. The piston in such actuator assembly is reciprocated within a cylinder by pressurized oil that is passed through a dedicated oil passage within the turbocharger. The oil is passed to the piston at a particular pressure using a valve. A rack and pinion assembly is used with the piston to convert reciprocating piston movement into rotary movement that ultimately actuates the movable member within the turbine, e.g., a VGT vane or nozzle.

Much as it is desirable to adjust the flow of exhaust gas to the turbine, it is also desirable to adjust the flow rate of boosted air from a turbocharger compressor to generate the appropriate power to compress the necessary quantity of inlet air depending on the amount of exhaust gas reaching the turbine. Accordingly, VGTs are also known to comprise a movable member within the compressor housing to control and/or regulate the amount of boosted air that is compressed by the compressor. As with VGTs, similar types of actuators can be used to control such movable members.

In an effort to optimize turbocharged engine operation, it is desirable that a VGT be configured to provide adjustable turbine and compressor characteristics, and to provide such desired characteristic of adjustability in a trouble-free manner.

SUMMARY OF THE INVENTION

The present invention comprises a VGT for internal combustion engines. The turbocharger comprises a center housing having a shaft positioned axially therethrough having a first and a second shaft end. A turbine housing is attached to one side of the center housing and has a turbine wheel disposed therein that is coupled to the first end of the shaft.

A first variable geometry member is disposed within the turbine housing for controlling the flow of exhaust gas to the turbine wheel. In an example embodiment, the first variable geometry member comprises a plurality of movable turbine vanes that are interposed between an exhaust gas inlet and the turbine wheel. A turbine unison ring is rotatably positioned adjacent the plurality of turbine vanes and is coupled to the vanes to effect rotation of the turbine vanes radially inwardly towards or outwardly away from the turbine wheel.

A compressor housing is attached to another side of the center housing opposite the turbine housing and has a compressor impeller disposed therein, the compressor impeller is coupled to the second end of the shaft. A second variable geometry member is disposed within the compressor housing to control the flow of air from the compressor impeller. In an example embodiment, the variable geometry member comprises a plurality of movable compressor vanes interposed between an air outlet and the compressor impeller. A compressor unison ring is rotatably positioned adjacent the plurality of compressor vanes and is coupled to the compressor vanes to effect rotation of the compressor vanes radially inwardly towards or outwardly away from the compressor impeller.

An actuator assembly is disposed within the turbocharger and is connected to the first and second variable geometry members to provide simultaneous actuation of the same. The actuator assembly is configured to provide desired first and second variable geometry member operation by use of balancing mechanical and electro-hydraulic forces.

BRIEF DESCRIPTION OF THE DRAWINGS

The details and features of the present invention will be more clearly understood with respect to the detailed description and the following drawings wherein.

DETAILED DESCRIPTION OF THE INVENTION

A variable geometry turbocharger (VGT) according to an exemplary embodiment of the present invention has a variable geometry turbine member, a variable geometry compressor member and an actuation system that controls the geometry of both the variable geometry turbine and the compressor members simultaneously. A control protocol of the actuation system facilitates near optimum control of the turbine input and compressor output even though there is a fixed dependency due to single actuation of both the turbine and the compressor variable geometry members.

Figure 1:
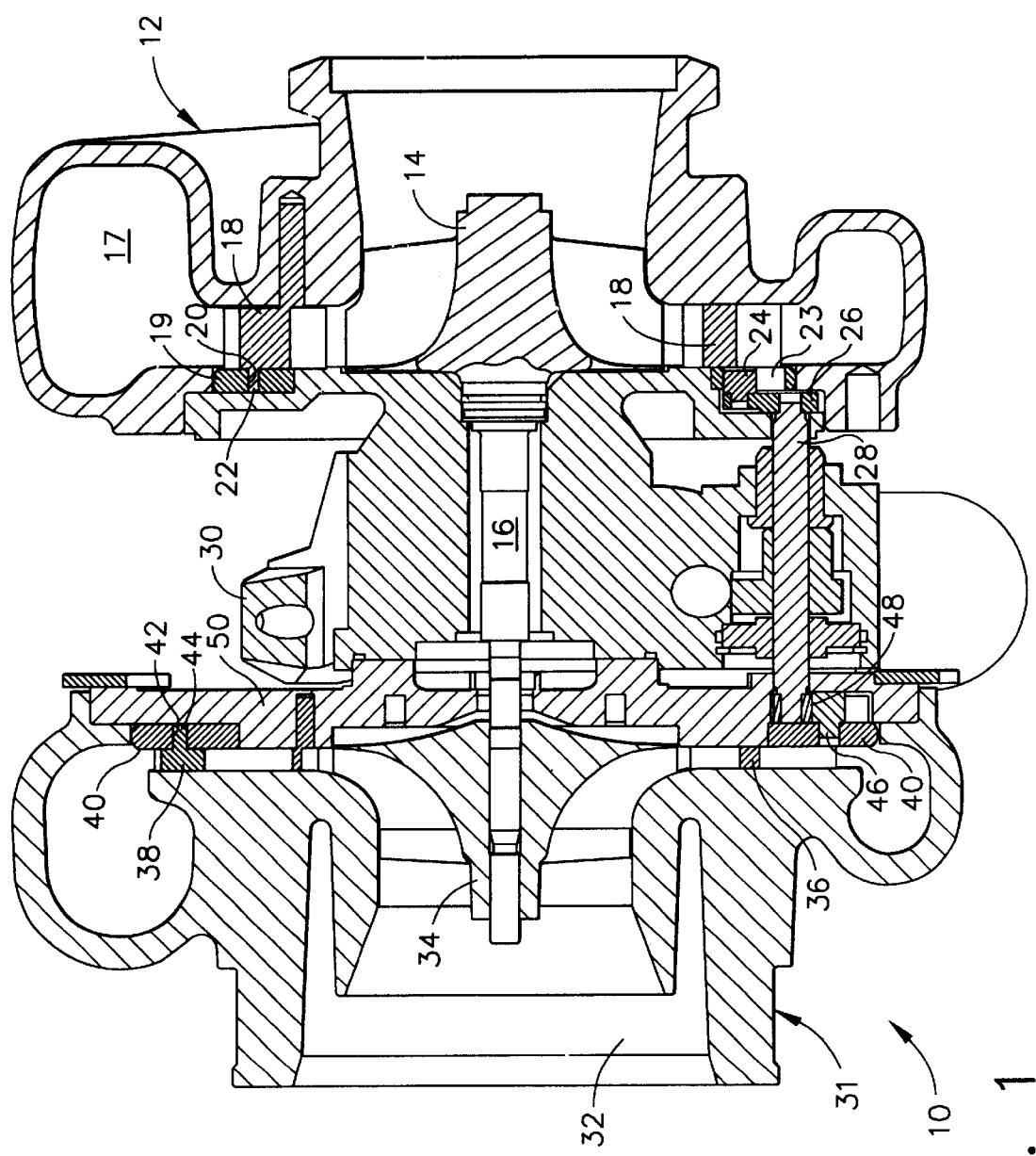
FIG. 1 is a cross sectional view along a longitudinal axis through the center of a VGT constructed according to an embodiment of the present invention.

Referring to FIG. 1, a turbocharger 10 has a turbine housing 12 adapted to receive exhaust gas from an internal combustion engine and distribute the exhaust gas to an exhaust gas turbine wheel or turbine 14 rotatably disposed within the turbine housing 12 and coupled to one end of a common shaft 16. The turbine housing 12 encloses a variable geometry member 17 that comprises a plurality of pivotably moving vanes 18 disposed therein. In an example embodiment, the variable geometry member is in the form of an exhaust gas intake interposed between an exhaust gas inlet and the turbine wheel. In an example embodiment, the vanes are cambered.

A turbine adjustment or unison ring 19 is positioned within the turbine housing 12 adjacent the vanes 18 to engage the vanes and effect radially inward and outward movement of the vanes vis-a-vis the turbine in unison. The turbine unison ring 19 comprises a plurality of slots 20 disposed therein that are configured to provide a minimum backlash and a large area contact when combined with correspondingly shaped tabs 22 that project from each of the turbine vanes 18. The turbine unison ring 19 is rotatably positioned within the housing, and is configured to engage and rotate turbine vanes through identical angular movement. U.S. Pat. No. 6,269,642 discloses a variable geometry turbocharger, comprising a unison ring and plurality of rotatable vane arrangement similar to that described above for this invention, and is hereby incorporated herein by reference.

The turbine unison ring 19 comprises an elliptical slot 23 that is configured to accommodate placement of an actuator pin 24 therein for purposes of moving the unison ring within the housing. The pin 24 is attached to one end of an actuator lever arm 26, that is attached at its other opposite end an actuator crank 28. The turbine actuating pin 24 and lever arm 26 are each disposed within a portion of the turbocharger center housing 30 adjacent the turbine housing. The actuator crank 28 is rotatably disposed axially through the turbocharger center housing 30, and is configured to move the lever arm 26 back and forth about an actuator crank longitudinal axis, which movement operates to rotate the actuating pin 24 and effect rotation of the unison ring 19 within the turbine housing. Rotation of the unison ring 19 in turn causes the plurality of turbine vanes to be rotated radially inwardly or outwardly vis-a-vis the turbine 14 in unison.

The turbocharger 10 also comprises a compressor housing 31 that is adapted to receive air from an air intake 32 and distribute the air to a compressor impeller 34 rotatably disposed within the compressor housing 31 and coupled to an opposite end of the common shaft 16. The compressor housing also encloses a variable geometry member 36 interposed between the compressor impeller and an air outlet. In an example embodiment, the variable geometry member is in the form of radial diffuser and comprises a plurality of pivoting vanes 38.

A compressor adjustment or unison ring 40 is rotatably disposed within the compressor housing 31 and is configured to engage and rotatably move all of the compressor vanes 38 in unison. The compressor unison ring 40 comprises a plurality of slots 42 disposed therein that are each configured to provide a minimum backlash and a large area contact when combined with correspondingly shaped tabs 44 projecting from each respective compressor vane. The compressor unison ring 40 effects rotation of the plurality of compressor vanes 38 through identical angular movement.

The compressor adjustment ring 40 comprises a slot and an actuating pin 46 that is rotatably disposed within the slot. An actuating lever arm 48 is attached at one of its end to the actuating pin 46, and is attached at another one of its ends to an end of the actuator crank 28 opposite the turbine unison ring lever arm 26. The compressor unison ring actuating pin 46 and lever arm 48 are disposed through a backing plate 50 that is interposed between the turbocharger compressor housing 31 and the center housing 30.

As described above for the actuation of the turbine unison ring 19, the actuator crank 28 is rotatably disposed through the center housing 30. Rotation of the actuator crank 28 causes the compressor unison actuating lever arm 48 to move around a longitudinal axis of the actuator crank, which in turn effects rotation of the compressor unison ring actuating pin 46. Rotation of the actuating pin 46 causes the compressor unison ring 40 to rotate along the backing plate 50, which in turn causes each of the compressor vanes 38 to be pivoted radially inwardly or outwardly vis-a-vis the compressor impeller 34.

As noted above, the actuator crank 28 is disposed axially through the turbocharger center housing 30, and includes opposite ends that project into the turbine housing 12 and the compressor housing 31 for simultaneously actuating the turbine unison ring 19 and compressor unison ring 40, respectively. The turbine housing 12, center housing 30, compressor housing 31, and backing plate 50 are each designed to permit placement of the common actuator crank axially therethrough for purposes of engaging and operating the turbine and compressor actuating members.

Figure 2:
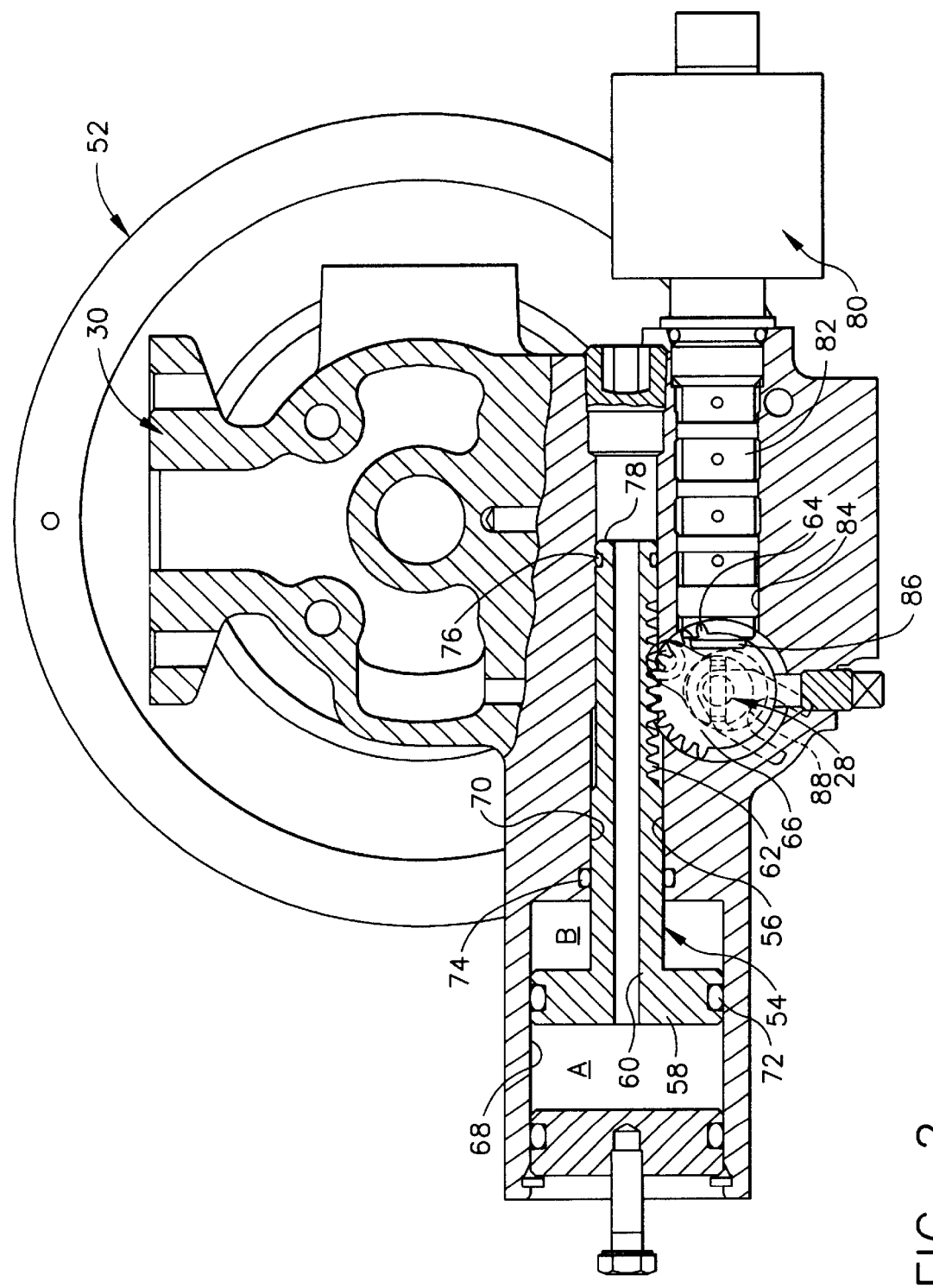
FIG. 2 is a cross sectional view of an actuator assembly as used with the VGT of FIG.

The actuator crank 28 may be actuated, i.e., rotated, by conventional actuating means. In an example embodiment, the actuator is rotated by use of an electro-hydraulic actuating device, such as that disclosed in U.S. Pat. No. 6,269,642. FIG. 2 illustrates such an electro-hydraulic actuating device 52, constructed according to principles of this invention, as used to provide the desired actuation for the VGT of FIG. 1. The actuating device 52 is integrally disposed within the turbocharger center housing 30, and generally comprises a double-acting piston assembly 54 that is positioned within a cylindrical bore 56 of the center housing that is oriented perpendicular to the actuator crank 28.

The double-acting piston assembly 54 comprises a piston 58 that incorporates a rod 60 projecting outwardly a distance therefrom. The rod 60 comprises a plurality of gear teeth 62 disposed along that are sized and shaped to engage complementary teeth 64 of a pinion gear 66 that is attached around the actuator crank 28, thereby providing a rack and pinion gear drive arrangement. The piston 58 is axially moveable within a first chamber 68 of the cylindrical bore 56, while the rod 60 is axially moveable within a second chamber 70 of the bore 56. The first and second chambers are in communication with each other.

A leak-tight seal is provided between the piston assembly 54 and the bore 56 by the following three seals. A first seal 72 is positioned within a groove disposed circumferentially around the piston 58 to provide a leak-tight seal with the first chamber 68. A second seal 74 is disposed within a circumferential groove around a section of the second cylinder 70. And a third seal 76 is disposed circumferentially around a portion of the rod 60 adjacent a rod end 78. As will be better described below, the use and placement of the first, second, and third seals serve to enable reciprocating piston assembly 54 movement within the cylindrical bore 56 via hydraulic force.

A solenoid valve 80 is mounted to the center housing 30 adjacent the cylindrical bore 56. In an example embodiment, the solenoid valve is in the form of a proportional 4-way hydraulic actuator control valve. The valve includes a channeled stem 82 that is positioned axially through a valve chamber 84 in the center housing. The solenoid valve 80 is configured to both supply oil to and dump oil from the piston assembly 54, thereby driving the rack and pinion gear arrangement to effect rotation of the actuator crank 28.

The solenoid valve 80 is reacted by a spring (not shown) having a cap 86 that engages a cam 88 attached to the actuator shaft 28 adjacent the pinion gear 66. Configured in this manner, the cap 86 provides mechanical feedback force to the valve through spring compression that is proportional to the angular position of the actuator crank 28. The mechanical feedback force is opposed by a force generated by the proportional solenoid that operates based on a received control signal, e.g., that receives a current signal from an engine electronic control unit (ECU).

Configured in this manner, the ECU sends a current or pulse-width-modulated signal to the solenoid that is proportional to a desired vane position. If the position of the vanes is not correct, then there will be an imbalance between the cam/spring force and the solenoid force. This imbalance operates to move the valve channeled stem 82 within the valve chamber 84 so as to direct supply oil to the correct side, e.g., side A or side B of the piston 58, and to drain oil from the other side of the piston until the forces are re-balanced and the vanes are at the commanded position. Oil is provided and drained via an arrangement of ports and conduits in the center housing that is in communication with the channeled stem and valve chamber.

The actuation system of this invention, therefore, operates in a closed loop hydraulically, and variations in the aerodynamic vane force, oil pressure, and friction in the system do not affect the position of the vanes. The key to success of this concept is the control logic that allows both the turbine and the compressor to be controlled simultaneously by a single actuation system.

The control logic of the present system is different from that of traditional variable geometry turbocharger control systems. Traditional VGT control systems utilize a boost map that correlates a desired boost level with a particular engine fuel delivery and engine speed. A boost sensor measures the boost level and adjusts vanes to increase or decrease the boost to match the boost map. From a controls stability and response standpoint, this is a challenging control method.

The present invention utilizes engine speed to control the actuator. The turbine nozzle area is controlled as a function of engine speed. At the same time, the compressor diffuser throat area is controlled as a function of engine speed. Engine speed, displacement, and Maximum Brake Mean Effective Pressure (BMEP) are three significant factors in selecting a correct turbine nozzle area for a fixed geometry turbocharger. For a specific engine, the displacement is fixed and the BMEP is relatively constant across the range of engine speed, thus the only variable is engine speed. At maximum engine speed the turbine nozzle requirement is at a maximum, and at minimum engine speed the turbine nozzle requirement is at a minimum. Therefore, with a fixed geometry turbocharger the turbine nozzle area is set to be the maximum to prevent over-boosting of the engine at high speed.

One of the advantages of a VGT using boost control is the improved response offered due to the ability to reduce the turbine nozzle area to accelerate the turbocharger. The engine speed v. turbine nozzle area logic still provides excellent response due to the fact that the fixed geometry must have a very large turbine nozzle area to prevent overboosting the engine at high speed. At all engine conditions below approximately 80 to 90 percent of rated engine speed, the VGT nozzle area is less than that of a fixed geometry turbocharger, and thus provides improved response. At very high engine speeds, response is not an issue.

Lines of constant engine speed may be drawn on a compressor map, and radiate from 0 pressure ratio, 0 mass flow. A variable vaned diffuser on the compressor effectively shifts the compressor map horizontally (along the mass flow axis). Thus, mass flow demand is a function of engine speed, and the mass flow related to the island of maximum efficiency is a function of diffuser throat area. Thus, the throat area of the diffuser should be controlled as a function of engine speed. Therefore, both the turbine nozzle area and the compressor diffuser throat area should be controlled as a function of engine speed. The present invention relies upon this principle.

Having now described the invention in detail as required by the patent statutes, those skilled in the art will recognize modifications and substitutions to the specific embodiments disclosed herein. Such modifications are within the scope and intent of the present invention.

What is claimed is:

1. A turbocharger for internal combustion engines, the turbocharger comprising:
    a center housing;
    a shaft positioned axially within the housing, the shaft having a first end and a second end;
    a turbine housing attached to one side of the center housing and having a turbine wheel disposed therein that is coupled to the first end of the shaft;
    a first variable geometry member disposed within the turbine housing between an exhaust gas inlet and the turbine wheel;
    a compressor housing attached to another side of the center housing opposite the turbine housing and having a compressor impeller disposed therein, the compressor impeller being coupled to the second end of the shaft;
    a second variable geometry member disposed within the compressor housing and interposed between an air outlet and the compressor impeller; and
    an actuator assembly disposed within the turbocharger and connected to the first and second variable geometry members to provide simultaneous actuation of the same;

wherein the actuator assembly includes an actuator crank disposed axially through the turbocharger center housing and coupled at opposite ends to the first and second variable geometry members; a piston assembly disposed within the center housing and coupled to the actuator crank by rack and pinion gear engagement: and a solenoid valve attached to the turbocharger and configured to provide reciprocating movement of the piston assembly by electro-hydraulic force.

2. The turbocharger as recited in claim 1 wherein the first variable geometry member comprises:
   a plurality of movable vanes positioned radially outwardly away from and concentrically around the turbine wheel, the vanes being pivotably attached at a first axial surface to a turbine housing wall surface; and
   a unison ring rotatably mounted adjacent a second axial surface of each vane, the unison ring comprising a plurality of slots disposed therein, wherein each slot accommodates an actuating tab projecting from a respective vane;
   wherein the unison ring is connected to the actuator assembly effect movement the unison ring and rotation of the each of the vanes.

3. The turbocharger as recited in claim 1 wherein the second variable geometry member comprises:
   a plurality of movable vanes positioned radially outwardly away from and concentrically around the compressor impeller; and
   a unison ring rotatably mounted adjacent an axial surface of each vane, the unison ring comprising a plurality of slots disposed therein wherein each slot accommodates an actuating tab projecting from a respective vane;
   wherein the unison ring is connected to the actuator assembly effect movement the unison ring and rotation of the each of the vanes.

4. The turbocharger as recited in claim 1 wherein the actuator assembly further comprises means for imposing a mechanical spring force onto the solenoid valve, and wherein the solenoid valve is a proportional solenoid for providing a balancing force against the mechanical spring force.

5. The turbocharger as recited in claim 4 wherein the balancing force generated by the proportional solenoid is a function of a signal from an engine electronic control unit.

6. The turbocharger as recited in claim 5 wherein the engine electronic control unit determines the signal for the proportional solenoid as a function of the engine speed of an internal combustion engine.

7. A variable geometry turbocharger for internal combustion engines, the turbocharger comprising:
   a center housing;
   a shaft positioned axially within the housing, the shaft having a first end and a second end;
   a turbine housing attached to one side of the center housing and having a turbine wheel disposed therein that is coupled to the first end of the shaft;
   a first variable geometry member disposed within the turbine housing comprising:
      a plurality of movable turbine vanes interposed between an exhaust gas inlet and the turbine wheel; and
      a turbine unison ring rotatably positioned adjacent the plurality of turbine vanes and coupled to the turbine vanes to effect rotation of the turbine vanes radially inwardly towards or outwardly from the turbine wheel;
   a compressor housing attached to another side of the center housing opposite the turbine housing and having a compressor impeller disposed therein, the compressor impeller being coupled to the second end of the shaft;
   a second variable geometry member disposed within the compressor housing comprising:
      a plurality of movable compressor vanes interposed between an air outlet and the compressor impeller; and
      a compressor unison ring rotatably positioned adjacent the plurality of compressor vanes and coupled to the compressor vanes to effect rotation of the compressor vanes radially inwardly towards or outwardly from the compressor impeller; and
   an actuator assembly disposed within the turbocharger and connected to both the first and second variable geometry members to provide simultaneous actuation of the same.

8. A variable geometry turbocharger for internal combustion engines, the turbocharger comprising:
   a center housing;
   a shaft positioned axially within the housing, the shaft having a first end and a second end;
   a turbine housing attached to one side of the center housing and having a turbine wheel disposed therein that is coupled to the first end of the shaft;
   a first variable geometry member disposed within the turbine housing between an exhaust gas inlet and the turbine wheel, the first variable geometry member comprising:
      a plurality of movable turbine vanes positioned radially outwardly away from and concentrically around the turbine wheel, the turbine vanes being pivotably attached at a first axial surface to a turbine housing wall surface; and
      a turbine unison ring rotatably mounted adjacent a second axial surface of each vane, the turbine unison ring comprising a plurality of slots disposed therein, wherein each slot accommodates an actuating tab projecting from a respective turbine vane;
      wherein the turbine unison ring is connected to the actuator assembly effect movement the turbine unison ring and rotation of the each of the turbine vanes;
   a compressor housing attached to another side of the center housing opposite the turbine housing and having a compressor impeller disposed therein, the compressor impeller being coupled to the second end of the shaft;
   a second variable geometry member disposed within the compressor housing and interposed between an air outlet and the compressor impeller, the second variable geometry member comprising:
      a plurality of movable compressor vanes positioned radially outwardly away from and concentrically around the compressor impeller, and
      a compressor unison ring rotatably mounted adjacent an axial surface of each compressor vane, the compressor unison ring comprising a plurality of slots disposed therein, wherein each slot accommodates an actuating tab projecting from a respective compressor vane;
      wherein the compressor unison ring is connected to the actuator assembly effect movement the compressor unison ring and rotation of the each of the compressor vanes; and
   an actuator assembly disposed within the turbocharger and connected to the first and second variable geometry members to provide simultaneous actuation of the same, the actuator assembly comprising:
an actuator crank disposed axially through the turbocharger center housing and coupled at opposite ends to the first and second variable geometry members;
a piston assembly disposed within the center housing and coupled to the actuator crank by rack and pinion gear engagement;
a solenoid valve attached to the turbocharger and configured to provide reciprocating movement of the piston assembly by electro-hydraulic force; and
means for imposing a mechanical spring force onto the solenoid valve, wherein the solenoid valve is a proportional solenoid for providing a balancing force against the mechanical spring force.

9. A method for operating a variable geometry turbocharger comprising the steps of:
monitoring the speed of an engine and determining turbocharger turbine and compressor operating characteristics based on engine speed;
based on the monitoring, providing an electrical signal to an actuator valve attached to the turbocharger, wherein the actuator operably couples to both a first variable geometry member in a turbine housing of the turbocharger, and a second variable geometry member in a compressor housing of the turbocharger; and
operating the actuator according to the electrical signal to simultaneously operate the first and second variable geometry members to effect turbocharger performance.

10. A turbocharger for internal combustion engines, the turbocharger comprising:
a center housing;
a shaft positioned axially within the housing, the shaft having a first end and a second end;
a turbine housing attached to one side of the center housing and having a turbine wheel disposed therein that is coupled to the first end of the shaft;
a first variable geometry member disposed within the turbine housing between an exhaust gas inlet and the turbine wheel;
a compressor housing attached to another side of the center housing opposite the turbine housing and having a compressor impeller disposed therein, the compressor impeller being coupled to the second end of the shaft;
a second variable geometry member disposed within the compressor housing and interposed between an air outlet and the compressor impeller; and
an actuator assembly disposed within the turbocharger and connected to the first and second variable geometry members to provide simultaneous actuation of the same;
wherein the first variable geometry member includes a plurality of movable vanes positioned radially outwardly away from and concentrically around the turbine wheel, the vanes being pivotably attached at a first axial surface to a turbine housing wall surface; and a unison ring rotatably mounted adjacent a second axial surface of each vane, the unison ring comprising a plurality of slots disposed therein, wherein each slot accommodates an actuating tab projecting from a respective vane; and wherein the unison ring is connected to the actuator assembly effect movement the unison ring and rotation of the each of the vanes.

11. A turbocharger for internal combustion engines, the turbocharger comprising:
a center housing;
a shaft positioned axially within the housing, the shaft having a first end and a second end;
a turbine housing attached to one side of the center housing and having a turbine wheel disposed therein that is coupled to the first end of the shaft;
a first variable geometry member disposed within the turbine housing between an exhaust gas inlet and the turbine wheel;
a compressor housing attached to another side of the center housing opposite the turbine housing and having a compressor impeller disposed therein, the compressor impeller being coupled to the second end of the shaft;
a second variable geometry member disposed within the compressor housing and interposed between an air outlet and the compressor impeller; and
an actuator assembly disposed within the turbocharger and connected to the first and second variable geometry members to provide simultaneous actuation of the same;
wherein the second variable geometry member includes a plurality of movable vanes positioned radially outwardly away from and concentrically around the compressor impeller; and a unison ring rotatably mounted adjacent an axial surface of each vane, the unison ring comprising a plurality of slots disposed therein, wherein each slot accommodates an actuating tab projecting from a respective vane; and wherein the unison ring is connected to the actuator assembly effect movement the unison ring and rotation of the each of the vanes.

12. A turbocharger for internal combustion engines, the turbocharger comprising:
a center housing;
a shaft positioned axially within the housing, the shaft having a first end and a second end;
a turbine housing attached to one side of the center housing and having a turbine wheel disposed therein that is coupled to the first end of the shaft;
a first variable geometry member disposed within the turbine housing between an exhaust gas inlet and the turbine wheel;
a compressor housing attached to another side of the center housing opposite the turbine housing and having a compressor impeller disposed therein, the compressor impeller being coupled to the second end of the shaft;
a second variable geometry member disposed within the compressor housing and interposed between an air outlet and the compressor impeller; and
an actuator assembly disposed within the turbocharger and connected to the first and second variable geometry members to provide simultaneous actuation of the same wherein the actuator assembly includes a solenoid valve that receives an electrical signal from an engine control unit.

* * * * *